Figure 1:
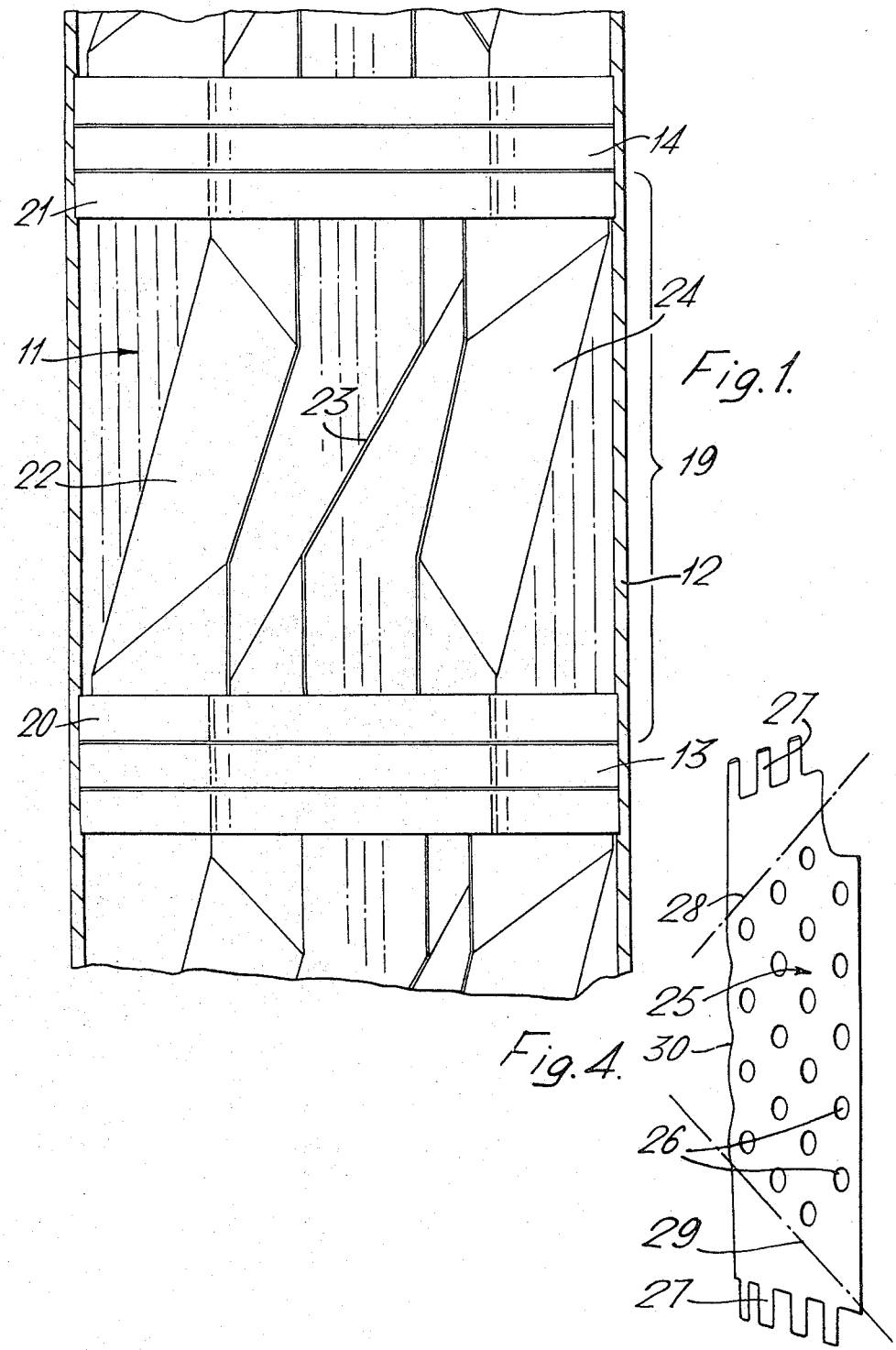

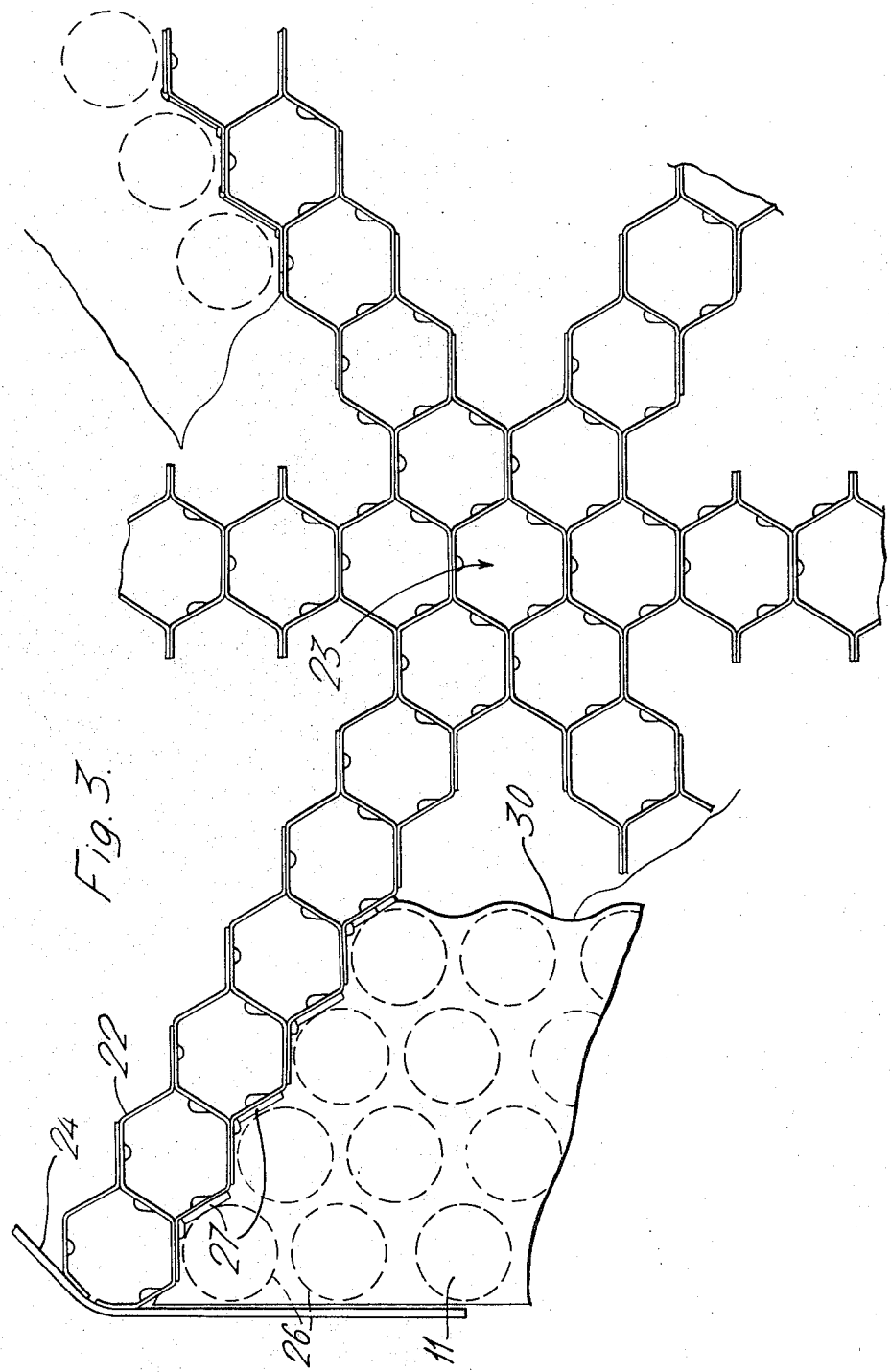

3,344,855
HEAT EXCHANGE ASSEMBLY INCLUDING GUIDE VANE STRUCTURE THEREIN
Peter Joseph Clark, Nelson, England, assignor to United Kingdom Atomic Energy Authority, London, England
Filed Feb. 11, 1965, Ser. No. 431,962
Claims priority, application Great Britain, Nov. 30, 1964, 48,492/64
5 Claims. (Cl. 165—159)

The present invention relates to heat exchange apparatus of the kind in which there is a plurality of longitudinally extending heat exchange elements which are spaced apart in a parallel array by support structures, the elements defining between them passageways for the flow of a fluid heat exchange medium longitudinally of the elements.

In certain circumstances of use, notably where the heat exchange elements are constituted by nuclear fuel in a fuel assembly of a nuclear reactor core, there can be a tendency for a temperature gradient to occur between opposite sides of the assembly. To counter this uneven temperature distribution, it may be desirable that the flow over the elements has a cross flow component induced in it. With an assembly which is generally symmetrical about a central axis, such a cross flow component would appear to be obtained most conveniently by imparting a swirling motion to the flow. For this purpose, the simple expedient of one or more helical swirler vanes might be satisfactory, but this may not be true of the case where the elements are closely pitched and by virtue of long length relative to cross section are liable to distortion by bowing. On account of the close pitching, cross flow components can be quickly damped and therefore a high degree of vane continuity is desirable. On the other hand, however, the possibility of bowing calls for support of the elements at frequent intervals. It is one of the objects of this invention to provide a structural combination capable of satisfying these conflicting requirements.

According to the invention, there is provided in an assembly of elongate heat exchange elements the combination of grid support structures alternating in sequence with guide vane sections, each grid structure comprising a mesh of metal strips engaged with the elements for spacing them apart in a parallel array and each guide vane section comprising a plurality of vanes disposed about, and tilted with respect to, a central axis to cause fluid flow over the elements to follow a generally helical path about said axis.

Figure 2:
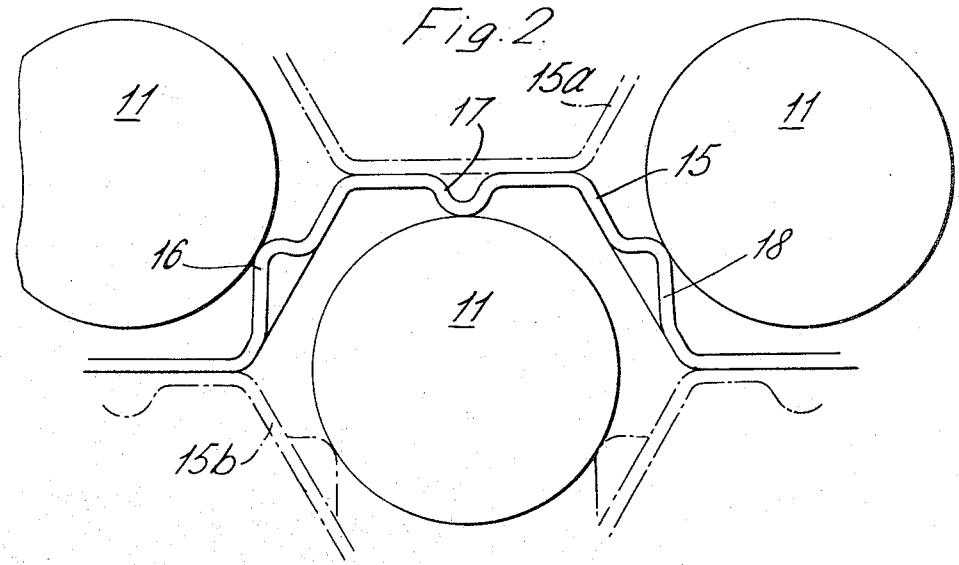
Figure 5:
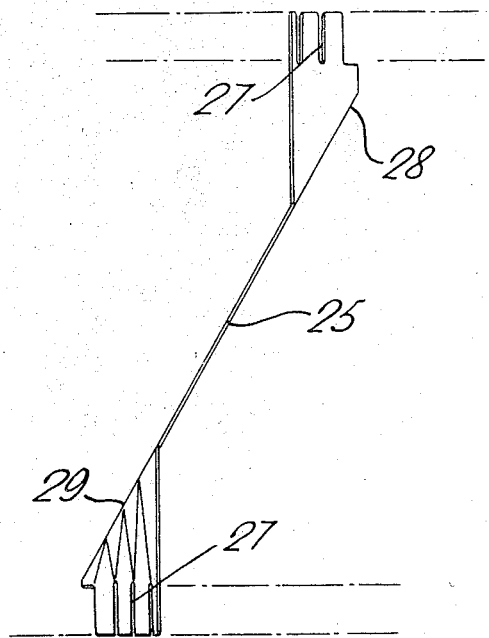

In the accompanying drawings there is shown by way of example one particular form of construction of the invention applicable to heat exchange elements constituted by nuclear fuel rods which are clustered together in parallel relationship into a fuel assembly for use in the core of a liquid metal cooled fast nuclear reactor. The various figures in the drawings are as follows:

FIGURE 1 is a section on the axis of the assembly,
FIGURE 2 is a detail in plan showing the basic construction of the grids,
FIGURE 3 is a detail in plan showing how the end piece of each guide vane section is constructed,
FIGURE 4 is a plan view of a guide vane blank, and
FIGURE 5 is an elevation of the guide vane blank after preforming in readiness for fixing in a guide vane section.

Referring initially to FIGURE 1 for a better understanding of the main features of the fuel assembly, it will be seen that the fuel rods 11 (identified by their centre lines) are pitched closely in a parallel array within a chamber defined by an elongated casing or wrapper 12. This casing is of a hexagonal shape which is uniform over the fuel-containing length of the casing, it being understood, although not shown, that at each end the casing is open so that, when the assembly is positioned upright in the core of the nuclear reactor, the liquid metal coolant, such as sodium, enters the casing at one end and passes through the passages defined between the fuel rods 11; having passed through these passages, the coolant discharges from the other end of the casing.

At intervals along their length, which is continuous and of uniform section, the fuel rods 11 are supported by grids, two of which are indicated at 13 and 14. Each grid has a honeycomb mesh of thin metal strips lying on edge in the longitudinal direction of the fuel rods, such mesh being fixed within an outer frame of which the exterior is seen in FIGURE 1. The type of honeycomb mesh employed is in accordance with U.S. patent application Ser. No. 292,972, now Patent No. 3,176,762 (now also available as French Patent No. 1,362,378) and is illustrated in greater detail in FIGURE 2. Each strip 15 has a corrugated configuration such that each corrugation defines three sides of a hexagonal compartment through which a fuel rod 11 extends. With adjacent strips 15a, 15b disposed to either side with the flat crests of the corrugations interengaged and secured together by spot welding, rows of hexagonal compartments for the fuel rods 11 are formed. Integral projections, such as 16, 17 and 18 are incorporated in the strips in such manner that in each compartment three projections are symmetrically arranged to give three points of supporting contact to the respective fuel rod. The projections are raised out of the metal strip by pressing and those, namely 15 and 18, where there is only a single thickness of metal strip are elongated by a taper to one side in order to give increased stiffness.

The space between each pair of adjacent grids is occupied by a guide vane section, that between the grids 13 and 14 in FIGURE 1 being denoted generally 19. Each guide vane section has end pieces 20 and 21 between which extend a number of symmetrically arranged guide vanes. In the present example there are six of these vanes and the three appearing in FIGURE 1 are denoted 22, 23 and 24.

In FIGURE 3 it will be seen that the end piece 20, and likewise the other end piece 21, is a skeleton grid, rather in the form of a spider, having single rows, such as 22, of hexagonal compartments extending radially outwards from a central cluster 23 of similar compartments. All the spider compartments are fabricated to the basic design of FIGURE 2. As in the case of the grids, the spiders are also fixed in respective frames, such as 24 (FIGURE 3).

The vanes will be best understood by consideration of the way in which they are made. The flat sheet blank 25 produced initially by stamping is shown in FIGURE 4 and has elliptical apertures 26 and, at each end, a series of tabs 27. This blank is bent along the bend lines indicated at 28 and 29, up in one case and down in the other, so that, as seen in FIGURE 5, the lines of tabs 27 at the ends have a relative angular displacement of 60°. The tabs 27 at both ends are then twisted slightly at their roots so that they can be fitted flush against faces of the compartments forming the spiders of the end pieces 20 and 21. In this position the tabs 27 are spot welded to the spider compartments as seen in FIGURE 3 and the vane thus formed therefore provides between the end pieces a flat surface which is tilted to deflect coolant flow in an approximately helical path about the central axis of the assembly.

The width of the blank 25 (FIGURE 4) is such that the inner edges of the vanes in the guide vane sections terminate at a position spaced from the central axis of the assembly so that fuel rods in the mid-region are not subject to flow disturbances. The inner edges of the vanes are scalloped as indicated at 30 so as to lie between the fuel rods. Those of the fuel rods which are in the region of the vanes pass through the apertures 26, the elliptical shape of these apertures being dimensioned to give a uniform slight clearance about the rods.

Regarding operation of the assembly, it is usual in the core of a nuclear reactor that a temperature gradient tends to occur between the opposite sides of the assembly. The generally helical motion imparted to the liquid metal coolant by the vanes, all of which are tilted in the same rotational sense, causes the coolant on the hotter side of the assembly to be transferred to the cooler side and vice versa. There is no need to rotate the coolant in the mid-region since this is already at the mean temperature below which it will not normally fall, with a specific flow rate of the coolant. As illustrated, the angle of tilt of the vanes is 60°, but it will be appreciated that the number of grids, the velocity of the coolant and other factors may necessitate a greater or lesser angle.

It will be understood that the invention is equally applicable to other heat exchange apparatus, especially where similar conditions as to fluid flow and temperature gradient obtain. Thus, the fuel rods may be replaced by other heat exchange elements such as tubes containing a fluid from which heat is to be extracted or to which heat is to be imparted from an external heat exchange medium.

I claim:
1. In an assembly of elongate heat exchange elements arranged in a cluster which is generally symmetrical about a central axis, the combination comprising grip support structures alternating in sequence with guide vane sections, each grid structure comprising a mesh of metal strips engaged with the elements for spacing them apart in a parallel array and each guide vane section comprising end pieces in locating engagement with certain elements of the cluster, and a plurality of guide vanes extending between the end pieces with a tilt relative to the central axis, and with a symmetrical disposition about said axis, to cause fluid flow over the elements to follow a generally helical path about said axis, the guide vanes having their outer edges substantially at the outer periphery of the cluster and their inner edges spaced from said axis and having apertures through which the elements pass with slight clearance.

2. The combination according to claim 1 wherein the guide vanes are flat.

3. The combination according to claim 1 wherein each end piece comprises a spider having rows of interconnected strip metal compartments extending radially of the central axis, said certain elements of the cluster passing respectively through the compartments each with engagement at a plurality of contact points, the guide vanes being attached at their ends to the compartment rows.

4. In an assembly of elongate heat exchange elements arranged in a cluster which is generally symmetrical about a central axis, the combination comprising a plurality of guide vanes disposed symmetrically about said axis, each guide vane being tilted with respect to said axis and formed with apertures through which the elements pass whereby to cause fluid flow over the elements to follow a generally helical path about said axis, and means extending transversely of said axis at opposite ends of the guide vanes for maintaining a spaced parallel relationship of the heat exchange elements and for supporting the guide vanes, said means including a mesh of metal element-engaging strips and having ends of the vanes connected thereto.

5. The combination according to claim 1 wherein each guide vane is flat and is bent at mutually oblique bend lines to form end portions aligned with the direction of, and generally radial to, said axis for attachment to the respective transverse means.

References Cited
UNITED STATES PATENTS
2,693,942 11/1954 Guala _____ 165—161
3,176,762 4/1965 Greenwood et al. __ 165—162

FOREIGN PATENTS
817,963 8/1959 Great Britain.
859,960 1/1961 Great Britain.

ROBERT A. O'LEARY, *Primary Examiner.*

M. A. ANTONAKAS, *Assistant Examiner.*